US008805857B2

(12) United States Patent
Bhammar et al.

(10) Patent No.: US 8,805,857 B2
(45) Date of Patent: Aug. 12, 2014

(54) MERGING OF ITEMS FROM DIFFERENT DATA SOURCES

(75) Inventors: Mitul Bhammar, Hyderabad (IN); Anadi Upadhyaya, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 637 days.

(21) Appl. No.: 12/578,585

(22) Filed: Oct. 14, 2009

(65) Prior Publication Data

US 2011/0087681 A1  Apr. 14, 2011

(51) Int. Cl.
*G06F 17/30* (2006.01)

(52) U.S. Cl.
USPC .............................. 707/752; 707/736; 715/825

(58) Field of Classification Search
None
See application file for complete search history.

(56) References Cited

U.S. PATENT DOCUMENTS

| | | | |
|---|---|---|---|
| 5,117,495 A | 5/1992 | Liu | |
| 5,220,675 A * | 6/1993 | Padawer et al. | 715/826 |
| 5,515,482 A | 5/1996 | Yamamoto et al. | |
| 6,303,889 B1 * | 10/2001 | Hayduchok et al. | 209/584 |
| 7,454,420 B2 | 11/2008 | Ray et al. | |
| 7,474,330 B2 | 1/2009 | Wren et al. | |
| 2002/0070977 A1 * | 6/2002 | Morcos et al. | 345/810 |
| 2007/0260513 A1 * | 11/2007 | Pavlov | 705/14 |

OTHER PUBLICATIONS

"Microsoft Corp.", "Display Data From Multiple Sources in a Single Data View", http://office.microsoft.com/en-us/sharepointdesigner/HA100991441033.aspx, Copyright Date: 2009, 7 pages.

"Exforsys Inc.", "Finding and Sorting Data in Datasets", http://www.exforsys.com/tutorials/vb.net-2005/finding-and-sorting-data-in-datasets.html, Tutorials: VB.NET 2005, Downloaded Circa: Mar. 24, 2009, 4 pages.

"Microsoft Corp.", "Sort and Group Data in a Data View", http://office.microsoft.com/en-us/sharepointdesigner/HA101030421033.aspx, Copyright Date: 2009, 5 pages.

"IBM Corp.", "Sorting Data", http://publib.boulder.ibm.com/infocenter/dmndhelp/v6rxmx/index.jsp?topic=/com.businessobjects.integration.eclipse.doc.crdesigner/reportdesigner/crtskgroupingdata.htm, Copyright Date: 2004, 2 pages.

"Microsoft Corp.", "Sort Records in Custom Order", http://office.microsoft.com/en-us/access/HP011564971033.aspx, Copyright Date: Feb. 10, 2008 9 pages.

"Bob Green", "Superlink—The Fast Alternative", http://www.robelle.com/tips/suprlink.html, Copyright Date: 2004, 6 pages.

* cited by examiner

*Primary Examiner* — Ajay Bhatia
*Assistant Examiner* — Miranda Huang
(74) *Attorney, Agent, or Firm* — Narendra Reddy Thappeta

(57) ABSTRACT

A digital processing system provided according to an aspect of the present invention processes items received from different data sources, specifically when a second set of items received from a second data source is related to corresponding ones of a first set of items received from a first data source. In one embodiment, each of the items in the first set and the second set is first assigned a corresponding digital value and then sorted according to a sort order of the assigned digital values to form a sorted output. The digital values are assigned such that items in the second set are grouped with related corresponding ones of the first set of items. Thus, items from different sources are merged (and sorted) based on the relation between the items.

22 Claims, 8 Drawing Sheets

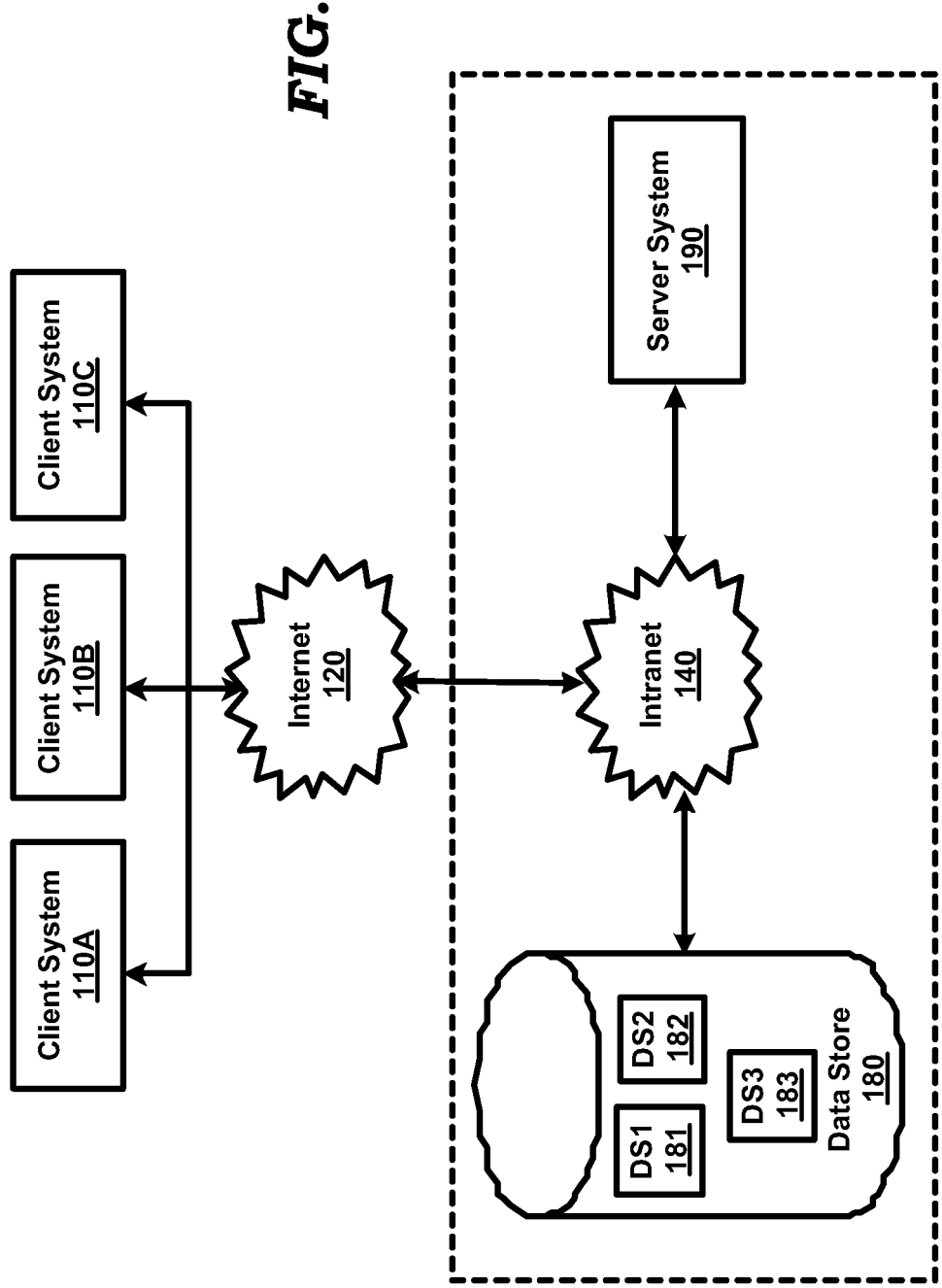

FIG. 2

| Number 201 | Identifier 202 | Description 203 | Type 204 |
|---|---|---|---|
| 1 | VIEW_REPORT | View Reports | REPORT |
| 2 | VIEW_DETAIL_REPORT | View Detailed Status Report | REPORT |
| 3 | PRINT_EMPLOYEE_REPORT | Print Employee Statements | COMM |
| 4 | RECALL_SUBMISSION_FOR_A PPROVAL | Recall Submission For Approval | APPR |
| 5 | SUBMIT_FOR_APPROVAL | Submit for Approval | APPR |
| 6 | MANAGE_COMPENSATION_ BUDGETS | Manage Compensation Budgets | BDGT |
| 7 | MANAGE_COMPENSATION_ MODELS | Manage Compensation Models | BDGT |
| 8 | SEND_US_FEEDBACK | Send us Feedback | FEEDBACK |

FIG. 3

| Identifier 302 | Enabled 304 |
|---|---|
| PRINT_EMPLOYEE_REPORT | Y |
| MANAGE_COMPENSATION_BUDGETS | Y |
| MANAGE_COMPENSATION_MODELS | Y |
| SEND_US_FEEDBACK | Y |

FIG. 4

| Number 401 | Identifier 402 | Description 403 | Type 404 |
|---|---|---|---|
| 1 | EVALUATE_EMPLOYEES | Evaluate Employees | PROMOTE |
| 2 | MANAGE_APPROVALS | Manage Approvals | APPR |
| 3 | PROMOTE_EMPLOYEES | Promote Employees | PROMOTE |
| 4 | REWARD_EMPLOYEES | Reward Employees | PROMOTE |
| 5 | GO_TO_CUSTOM_TAB | Go to Custom Tab | COMP |

```
601: SELECT LOOKUP_CODE, MEANING, DISP_ORDER FROM (
602: (
603: SELECT LOOKUP_CODE, MEANING, DECODE(LOOKUP_CODE,'PRINT_EMPLOYEE_STATEMENTS', 20, 'VIEW_REPORTS', 110,
604:                                       'VIEW_DETAILED_STATUS_REPORT', 120,
605:                                       'RECALL_SUBMISSION_FOR_APPROVAL', 220, 'SUBMIT_FOR_APPROVAL', 220,
606:                                       'MANAGE_COMPENSATION_BUDGETS', 310,
607:                                       'MANAGE_COMPENSATION_MODELS', 320, 'SEND_US_FEEDBACK', 410) DISP_ORDER
608: FROM
609:     HR_LOOKUPS
610: WHERE
611: (
612:     LOOKUP_CODE IN
613:     (
614:         SELECT LCODE FROM
615:         (SELECT
616:             DECODE(FEEDBACK_ENABLED_FLAG, 'Y', 'SEND_US_FEEDBACK', NULL) L1,
617:             DECODE(BUDGET_ENABLED_FLAG, 'Y', 'MANAGE_COMPENSATION_BUDGETS', NULL) L2,
618:             DECODE(MODEL_ENABLED_FLAG, 'Y', 'MANAGE_COMPENSATION_MODELS', NULL) L3,
619:             DECODE(STMT_ENABLED_FLAG, 'Y', 'PRINT_EMPLOYEE_STATEMENTS', NULL) L4
620:         FROM
621:             CMP_PLANS_VL
622:         WHERE
623:             PLAN_ID=:BindPlanId
624:         )
625:         UNPIVOT EXCLUDE NULLS
626:         (LCODE FOR INDX IN (L1,L2,L3,L4))
627:     )
628:     UNION
629:     SELECT
630:         DECODE(SUBMIT_CODE, 'SUBMITTED', DECODE(APPROVAL_CODE, NULL
631:                 ,'RECALL_SUBMISSION_FOR_APPROVAL'), 'SUBMIT_FOR_APPROVAL')
632:     FROM
633:         CMP_CWB_PERSON_INFO
634:     WHERE
635:         PERSON_EVENT_ID= :BindPersonEventId
636: )
637:     OR LOOKUP_CODE = 'VIEW_DETAILED_STATUS_REPORT'
638:     OR LOOKUP_CODE = 'VIEW_REPORTS'
639: )
640: AND LOOKUP_TYPE='CMP_CWB_TAKE_ACTION'
```

*FIG. 6A*

```
641:  /**********/UNION
642:  (
643:  SELECT ATTRIBUTE_VALUE LOOKUP_CODE, DISPLAY_NAME MEANING, DECODE(TEXT_VALUE1,'APPR',200 + ROWNUM, ROWNUM), DISP_ORDER FROM
644:    (
645:    SELECT
646:      ATTRIBUTE_VALUE, DISPLAY_NAME, DECODE(TEXT_VALUE1,'APPR',0, ORDER_NUM) NEW_ORD,
                                                                              TEXT_VALUE1, ORDER_NUM
647:    FROM
648:      CMP_LOOKUP_USAGES_VL
649:    WHERE
650:      ATTRIBUTE_NAME='CMP_CWB_WORKSHEET_TABS' AND ENABLED_FLAG='Y'
651:      AND KEY_TYPE='PLAN' AND KEY_VALUE=:BindPlanId AND TEXT_VALUE1 IS NOT NULL
652:    ORDER BY NEW_ORD, ORDER_NUM, DISPLAY_NAME
653:    )
654:  )
655:  /**********/UNION
656:  SELECT 'NONE', '_____', 100 FROM DUAL
657:  /**********/UNION
658:  SELECT 'NONE', '_____', 200 FROM CMP_CWB_PERSON_INFO
659:  WHERE (PERSON_EVENT_ID= :BindPersonEventId AND DECODE(SUBMIT_CODE, 'SUBMITTED', DECODE(APPROVAL_CODE, NULL,
          'RECALL_SUBMISSION_F_OR_APPROVAL'), 'SUBMIT_FOR_APPROVAL')
660:  IS NOT NULL) OR (1 = (SELECT 1 FROM CMP_LOOKUP_USAGES_VL WHERE ATTRIBUTE_NAME='CMP_CWB_WORKSHEET_TABS' AND
                            ENABLED_FLAG='Y'  AND KEY_TYPE='PLAN' AND KEY_VALUE=:BindPlanId
661:  +AND TEXT_VALUE1='APPR' AND ROWNUM=1))
662:  /**********/UNION
663:  SELECT 'NONE', '_____', 300 FROM CMP_PLANS_VL WHERE (BUDGET_ENABLED_FLAG='Y' OR MODEL_ENABLED_FLAG='Y') AND
      PLAN_ID=:BindPlanId
664:  /**********/UNION
665:  SELECT 'NONE', '_____', 400 FROM CMP_PLANS_VL WHERE FEEDBACK_ENABLED_FLAG='Y' AND PLAN_ID=:BindPlanId
666:  )
667:  ORDER BY DISP_ORDER
```

| DISP_ORDER | LOOKUP_CODE |
|---|---|
| 110 | VIEW_REPORT |
| 120 | VIEW_DETAIL_REPORT |
| 20 | PRINT_EMPLOYEE_REPORT |
| 220 | SUBMIT_FOR_APPROVAL |
| 310 | MANAGE_COMPENSATION_BUDGETS |
| 320 | MANAGE_COMPENSATION_MODELS |
| 410 | SEND_US_FEEDBACK |

| DISP_ORDER | LOOKUP_CODE |
|---|---|
| 1 | EVALUATE_EMPLOYEES |
| 202 | MANAGE_APPROVALS |
| 3 | PROMOTE_EMPLOYEES |
| 4 | REWARD_EMPLOYEES |
| 5 | GO_TO_CUSTOM_TAB |

| DISP_ORDER | LOOKUP_CODE | MEANING |
|---|---|---|
| 1 | EVALUATE_EMPLOYEES | Evaluate Employees |
| 3 | PROMOTE_EMPLOYEES | Promote Employees |
| 4 | REWARD_EMPLOYEES | Reward Employees |
| 5 | GO_TO_CUSTOM_TAB | Go to Custom Tab |
| 20 | PRINT_EMPLOYEE_REPORT | Print Employee Statements |
| 100 | NONE | ---------- |
| 110 | VIEW_REPORT | View Reports |
| 120 | VIEW_DETAIL_REPORT | View Detailed Status Report |
| 200 | NONE | ---------- |
| 202 | MANAGE_APPROVALS | Manage Approvals |
| 220 | SUBMIT_FOR_APPROVAL | Submit for Approval |
| 300 | NONE | ---------- |
| 310 | MANAGE_COMPENSATION_BUDGETS | Manage Compensation Budgets |
| 320 | MANAGE_COMPENSATION_MODELS | Manage Compensation Models |
| 400 | NONE | ---------- |
| 410 | SEND_US_FEEDBACK | Send us Feedback |

901, 902, 903

MERGING OF ITEMS FROM DIFFERENT DATA SOURCES

BACKGROUND

1. Technical Field

The present disclosure relates to digital processing systems and more specifically to merging of items from different data sources.

2. Related Art

Merging refers to combining items from different data sources into a single list. The items in such lists are often ordered (e.g., ascending or descending order of the items based on representation in the form of text or digital values) using various sort techniques while generating the merged output, as is well known in the relevant arts. There are often situations when such ascending or descending order sorting does not meet the requirements of corresponding situations.

BRIEF DESCRIPTION OF THE DRAWINGS

Example embodiments of the present invention are described with reference to the accompanying drawings briefly described below.

FIG. 1 is a block diagram illustrating the details of an example environment (computing system) in which several aspects of the present invention can be implemented.

FIGS. 2-4 depict respective tables illustrating the details of corresponding data sources in an embodiment.

FIGS. 6A and 6B together depicts a set of instructions, which merge items from different data sources in an embodiment of the present invention.

FIGS. 7 and 8 are tables respectively depicting the assignment of sort value used as a basis for merging and sorting items in corresponding data sources, in an embodiment.

FIG. 9 depicts a table containing the merged and sorted items in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 5:
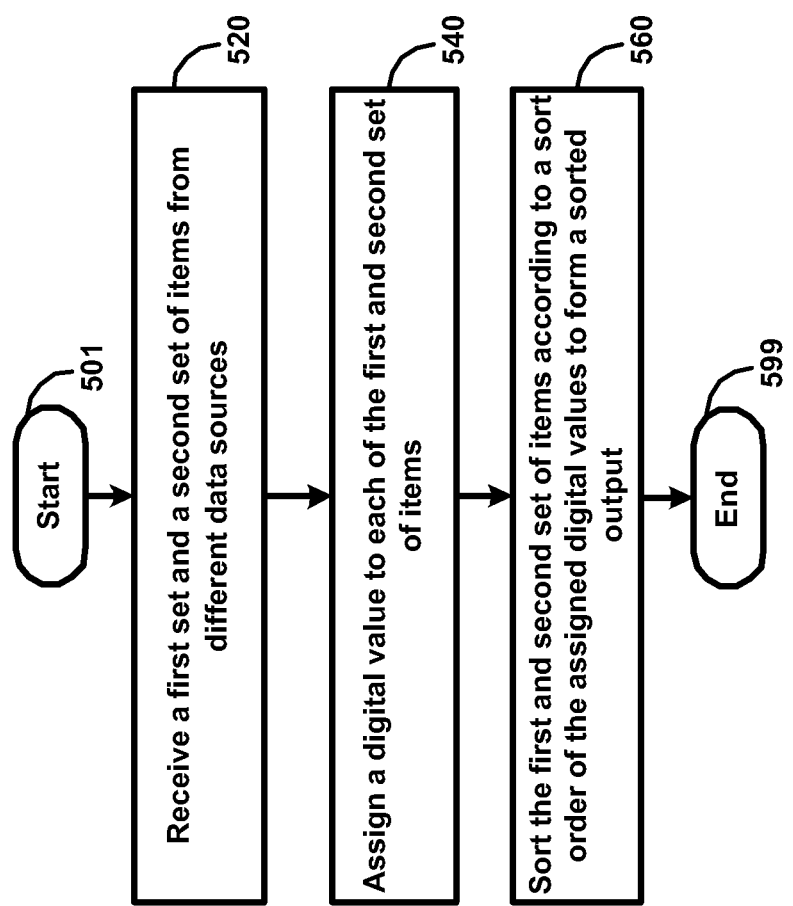
FIG. 5 is a flow chart illustrating the manner in which items from different data sources are merged according to an aspect of the present invention.

A digital processing system provided according to an aspect of the present invention processes items received from different data sources, specifically when a second set of items received from a second data source is related to corresponding ones of a first set of items received from a first data source. In one embodiment, each of the items in the first set and the second set is first assigned a corresponding digital value and then sorted according to a sort order of the assigned digital values to form a sorted output. The digital values are assigned such that items in the second set are grouped with related corresponding ones of the first set of items.

Thus, items from different sources are merged (and sorted) based on the relation between the items.

According to one more aspect of the present invention, the above noted features are implemented in the context of a compensation management system, which has different sets of action items from different sources (one set which is enabled for a user and another set which is customized for the same user). Such sets of action items are merged based on type using a SQL query, and the sorted output is provided as a response to a request for the action items corresponding to a plan.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

FIG. 1 is a block diagram illustrating the details of an example environment (computing system) in which several aspects of the present invention can be implemented. The block diagram is shown containing client systems 110A-110C, Internet 120, intranet 140, data store 180 and server system 190.

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between data store 180 and server system 190, all provided within an enterprise (shown with dotted boundaries). Internet 120 extends the connectivity of these (and other systems of the enterprise) with external systems such as client systems 110A-110C.

Each of intranet 140 and Internet 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 110A-110C represents a system such as a personal computer, workstation, mobile station, etc., used by users to generate (client) requests to enterprise/business applications executing in server system 190. The client requests may be generated using appropriate user interfaces. In general, a client system sends requests to an application for performing desired tasks and receives corresponding responses containing the results of performance of the requested tasks.

Data store 180 represents a non-volatile storage facilitating storage and retrieval of a collection of data by one or more applications executing in server system 190. In one embodiment, data store 180 is implemented as a database server using relational database technologies and therefore provides storage and retrieval of data using structured queries such as SQL (Structured Query Language). As relevant to some aspects of the present invention, data store 180 contains multiple data sources (e.g., different tables of same or different databases) DS1-DS3 181-183.

It may be appreciated that SQL refers to a special-purpose, generally non-procedural language (generally indicates what to retrieve based on conditions, in contrast to how to retrieve) that supports the definition, manipulation, and control of data in systems implementing relational database technologies. However, data store 180 can be implemented using other technologies (e.g., procedural language, hierarchical databases).

Server system 190 represents a server, such as a web/application server, which executes business/enterprise applications capable of processing client requests received from client systems 110A-110C and sending corresponding responses to the requesting client system. Some of the responses (for example, a web page) may include a list of items, which may need to be generated by merging (and sorting) items from different data sources (such as DS1-DS3). The need for such merging in an example environment is described below.

3. Enterprise Application Having a Need for Merging

For illustration, the need for merging is described with respect to a compensation management application executing in server system 190. Broadly, the compensation management application provides various plans (e.g., those related to stocks, sales, bonus, performance, for different years), and a user is provided a convenient interface to select a desired action of a desired plan the user is entitled to use, as described briefly below.

FIGS. 2, 3 and 4 depict tables in respective data sources DS1-DS3 181-183. DS1 181 has a complete list of menu/action items for all plans which are provided by a vendor of the compensation management application. DS2 182 indicates the menu/action items (of DS1) that are enabled or disabled for each plan (data corresponding to a single plan only shown for conciseness), and is used to exclude certain items of DS1 (which in turn may be used to specify action items which are to be alternatives only, etc). DS3 183 has a list of additional customized menu/action items which are defined by customers that have to be included in the complete list of action items to be shown in a web page served to client systems 110A-110C.

Thus, assuming that a user has selected an appropriate plan, the menu/action items corresponding to the consolidated items of FIGS. 2 (since none are excluded/disabled in DS2 182 as shown in FIG. 3) and 4 are shown together on the web page sent as a response to client systems 110A-110C.

It should be appreciated that typical plans often have a large number of action items and it may accordingly be difficult for a user to identify options related to a corresponding function (e.g., compensation), in particular when the items for similar function are from different data sources. The difficulty is compounded as the number of data sources increases.

Several aspects of the present invention address one or more of such requirements as described below in further detail.

4. Merging Items From Different Data Sources

FIG. 5 is a flow chart illustrating the manner in which items from different data sources are merged according to an aspect of the present invention. The flowchart is described with respect to FIGS. 1-4, and in relation to server system 190 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 501, in which control immediately passes to step 520.

In step 520, server system 190 receives a first set of items and a second set of items from different data sources (for example, DS1 181 and DS3 183). The items can be in any format, such as shown in columns 202 and 402, and may include text, numbers, etc. The description is continued assuming that the first set of items includes the items that are enabled (or conditionally selected) based on the information maintained in DS2 182 shown in FIG. 3.

In step 540, server system 190 assigns a digital value to each of the first set of items and the second set of items. In step 560, server system 190 sorts the first and second set of items according to a sort order (ascending or descending) of the assigned digital values to form a sorted output. The sort technique imposes a sequence (output sequence) on the items in the sorted output.

Thus, the digital values assigned in step 540 and the sort order used in step 560, determine the relative position of each item in the output sequence.

According to an aspect of the present invention, the digital values to be assigned to different items are determined by the function (type in one embodiment described below) of each of the items. In general, the digital values are assigned such that items of the second set are grouped with (functionally) related ones of the items in the first set.

For example, the items numbered "4" and "5" (in column 201) of FIG. 2 and the item number "2" (in column 401) of FIG. 4 may be assigned appropriate digital values to group the items together (in the output order), since the items are all specified as being of the same type "APPR". The various groups of items may similarly be assigned different ranges of digital values to ensure that the items are sorted in a desired order of the groups.

The sorting based on the assigned digital value causes the different items received from different data sources to be grouped together based on the function, as well as to sort the groups of items (formed by merging the first and second set of items) in the desired order.

The sorted output may be then included in the response sent to a request from one of client systems 110A-110C. In one embodiment, the sorted output corresponds to action items for a compensation management application and accordingly the sorted output is included in a web page sent as a response to a client system. The web page including the sorted output is then displayed on a display unit associated with the requesting client system. The flow chart ends in step 599.

Thus, items from different sources are merged (and sorted) in a desired manner. An example implementation in the compensation management application is described below for illustration.

5. Example Implementation

FIGS. 6A and 6B together depicts a set of instructions which merge items from different data sources in an embodiment of the present invention. The instructions (SQL query) operate to retrieve and sort the action items for a single plan (indicated by variable BindPlanId).

It may be broadly appreciated by examining lines 601-667 that the various items (e.g., 'PRINT_EMPLOYEE_STATE-MENTS', 'VIEW_REPORTS', 'VIEW_DETAILED_STA-TUS_REPORT', 'RECALL_SUBMISSION_FOR_AP-PROVAL') are assigned corresponding digital values (e.g. 20, 110, 120, 220, etc). The items are assumed to be required according to an ascending order, and thus the key values 'PRINT_EMPLOYEE_STATEMENTS', 'VIEW_REPORTS', 'VIEW_DETAILED_STATUS_REPORT', 'RECALL_SUBMISSION_FOR_APPROVAL') are deemed to be specified in that order. The second set of items from data source DS3 may be placed either before or after the first set of action items from data source DS1.

The procedure further assigns individual sort/digital values (DISP_ORDER) to each of the items based on corresponding function/type of the items. The items are finally sorted based on the assigned digital values as described below.

Lines 603-609 assign digital values to each action item of the table of DS1 181 (assuming HR_LOOKUPS represents that table). The assigned digital values are depicted in column 701 of the table of FIG. 7. Though the digital values are shown hard coded (pre-defined) in the instructions, it may be appreciated that the digital values may be assigned dynamically based on the desired position for items of specific function, in the output sequence. In one embodiment, a user specifies a corresponding range of digital values for each type to control the relative position of the items in the output sequence.

Lines 612-626 checks whether the specific optional action items (known a priori and thus coded in the procedure) of DS1 181 are enabled and then includes the enabled action items (as specified in column 304 in DS2 182 of FIG. 3) as items to be assigned sort value and be sorted. Lines 627-635 operate to select some of the action items (either "SUBMIT_FOR_APPROVAL" or "RECALL_SUBMISSION_FOR_APPROVAL") specified in DS1 based on information (the values of "SUBMIT_CODE" and "APPROVAL_CODE") maintained in another data source. Lines 636 and 637 operate to include non-optional action items noted there.

Lines 642-654 operate to retrieve the action items from DS3 183 and assign corresponding sort values such that the action items are grouped with (functionally) related items from data source DS1 181. In particular, line 643 assigns different sort values to action items matching specific types (e.g., APPR). For items matching the type APPR, the assigned sort value equals 200 plus the row number (shown in column 401). The value 200 is chosen to reflect that all the matching action items are to be grouped with "RECALL_SUBMISSION_FOR_ APPROVAL" or "SUBMIT_FOR_APPROVAL" (both with the sort value 220) having the same type "APPR" in DS1 181 and need to appear ahead of that action item. The other action items are assigned a sort value equaling the corresponding row number.

The assignments are reflected in column 901 of the table of FIG. 9. It may be readily observed that the action item MANAGE_APPROVALS is assigned a value 202 (offset 200+row number 2) since the action item type is APPR. Other action items (remaining rows) are assigned a sort value of the same row number (that is, with offset 0) as in column 401. Lines 656, 658-661, 663 and 665 include delimiters ( - - - ) at appropriate positions in the sort output by assigning suitable sort values.

Figure 10:
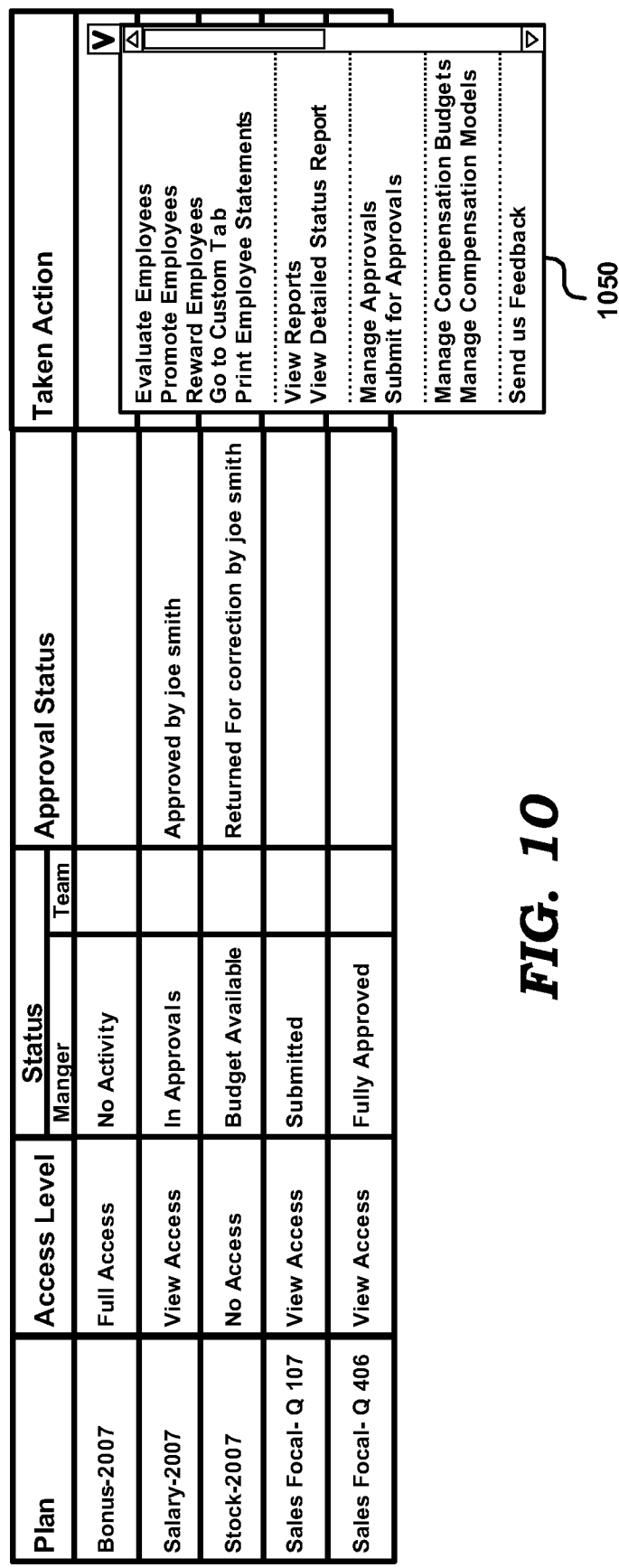
FIG. 10 depicts the display of the items, which are easier to navigate for users, based on the merging and sorting approaches, in an embodiment.

It may be observed that the dynamic action items of type "PROMOTE" in FIG. 4 are shown in the same sequence in the sorted output of FIG. 10. In general, the row number (column 401) of the action items specifies an internal sequence for each of the group of action items (e.g. of the same type "PROMOTE"), and accordingly the assignment of values by adding an appropriate offset (e.g., 200 or 0) ensures that the same internal sequence of the action items (as specified in the inputs shown in FIG. 4) is preserved in the sorted output (FIG. 10).

The command UNION in lines 627, 641, 655, etc., operates to provide a list of items to be sorted, and line 667 operates to sort the combined list based on the assigned sort value (DISP_ORDER). Line 601 indicates that the identifiers (LOOKUP_CODE), descriptions (MEANING) and the sort values (DISP_ORDER) of the items that are to be retrieved and displayed. FIG. 10 depicts the sorted output of operation of the procedure of FIGS. 6A and 6B based on the tables of FIGS. 2-4.

The sorted output is used with respect to a user interface, as depicted in FIG. 10. As may be readily appreciated, the menu/action items of related functionality are grouped (thereby making the navigation easier). For example, the menu/action items 'MANAGE APPROVAL' is shown grouped with "SUBMIT FOR APPROVALS" as they are both of the same type "APPR".

It should be appreciated that the features described above can be implemented in various embodiments as a desired combination of one or more of hardware, executable modules, and firmware. The description is continued with respect to an embodiment in which various features are operative when the software instructions described above are executed.

6. Digital Processing System

Figure 11:
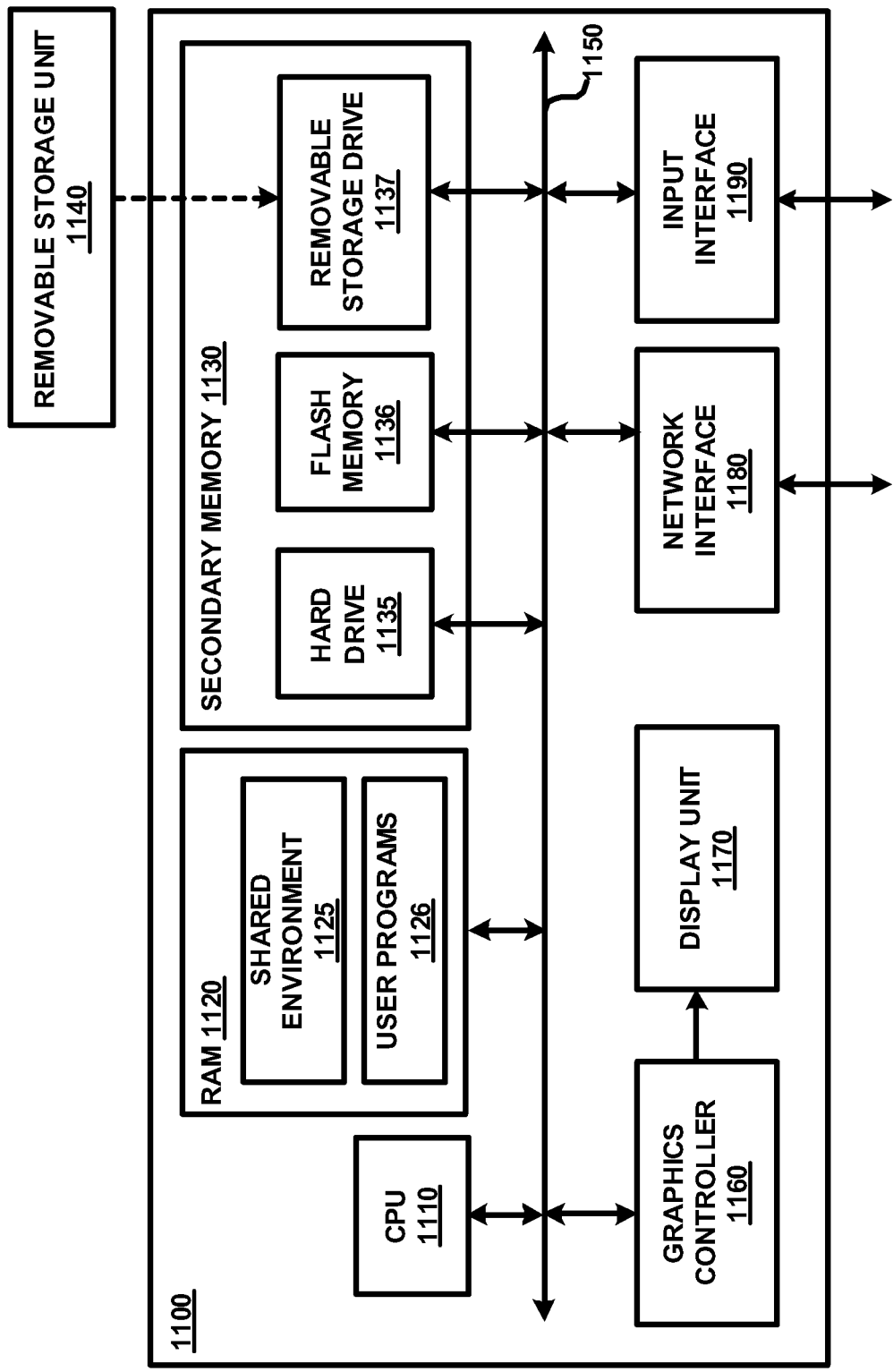
FIG. 11 is a block diagram illustrating the details of a digital processing system in which several features of the present invention are operative upon execution of appropriate software instructions.

FIG. 11 is a block diagram illustrating the details of digital processing system 1100 in which various aspects of the present invention are operative by execution of appropriate software instructions. Digital processing system 1100 corresponds to server system 190.

Digital processing system 1100 may contain one or more processors (such as a central processing unit (CPU) 1110), random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit.

RAM 1120 may receive instructions from secondary memory 1130 using communication path 1150. RAM 1120 may further store various data (e.g., the various tables described above). RAM 1120 is shown currently containing software instructions constituting shared environment 1125 and/or user programs 1126 (such as enterprise applications processing user requests for serving web pages, etc.). Shared environment 1125 contains utilities shared by user programs, and such shared utilities include operating system, device drivers, virtual machines, etc., which provide a (common) run time environment for execution of user programs/applications.

Graphics controller 1160 generates display signals (e.g., in RGB format) to display unit 1170 based on data/instructions received from CPU 1110. Display unit 1170 contains a display screen to display the images (e.g., the screen of FIG. 10) defined by the display signals. Input interface 1190 may correspond to a keyboard and a pointing device (e.g., touch-pad, mouse). Network interface 1180 provides connectivity to a network (e.g., using Internet Protocol), and may be used to communicate with other connected systems (such as client systems 110A-110C and data store 180) of FIG. 1.

Secondary memory 1130 may contain hard drive 1135, flash memory 1136, and removable storage drive 1137. Secondary memory 1130 may store the data (e.g., DS1 181, DS2 182, and DS3 183) and software instructions (such as the SQL query shown in FIGS. 6A-6B), which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of processing items from different data sources, said method comprising:

receiving a first set of items from a first data source and a second set of items from a second data source, each of said second set of items being related to a corresponding one of said first set of items;

assigning each of said first set of items a corresponding one of a first set of digital values and each of said second set of items a corresponding one of a second set of digital values, wherein said assigning assigns a first digital value of said first set of digital values to a first item of said first set of items, wherein said assigning assigns a second digital value of said second set of digital values to a second item of said second set of items; and sorting all of said first set of items and said second set of items according to a sort order of the assigned digital values containing said first set of digital values and said second set of digital values to form a sorted output, wherein said sorted output is a one-dimensional list containing both of said first set of items and said second set of items according to said sort order, wherein said first set of items and said second set of items are in an output sequence in said one-dimensional list after said sorting, with each item of said one-dimensional list having a corresponding position in said output sequence, wherein each of said first set of digital values and said second set of digital values and said sort order determines the relative position of each item in said output sequence, wherein said first item is positioned before said second item in said output sequence if said first digital value is before said second digital value in said sort order, wherein said first item is positioned after said second item in said output sequence if said first digital value is after said second digital value in said sort order, wherein said first set of digital values and said second set of digital values are assigned such that items of said second set of items are grouped with related ones of corresponding ones of said first set of items such that at least one item of one of the first set of items and the second set of items would be located between two items of the other one of the first set of items and the second set of items in said one-dimensional list.

2. The method of claim 1, wherein both of said first item and said second item are included in said output sequence if said first digital value equals said second digital value.

3. The method of claim 2, wherein said first set of items are already in said sort order as a source one-dimensional list based on said first set of digital values, and wherein said sort order is one of an ascending order or a descending order, wherein said sorting operates to insert each of said second said of items into said source one-dimensional list according to the assigned one of said second set of digital values such that said sorted output is also according to said sort order.

4. The method of claim 3, wherein each of said first set of items and said second set of items comprises a corresponding menu item, said method further comprising:

displaying said sorted output on a display unit such that all of said first set of items and said second set of items are displayed with related items grouped.

5. The method of claim 4, wherein a first item and a second item contained in said first set of items are respectively assigned a first digital value and a second digital value contained in said first set of digital values, wherein said assigning assigns a corresponding digital value between said first digital value and said second digital value to each of a third subset of items that are desired to be grouped with said first item, wherein said third subset of items are positioned after said first item in said output sequence after said sorting according to said ascending order.

6. The method of claim 5, wherein each of said third subset of items is associated with a corresponding internal value to specify an internal sequence for said third subset of items, wherein said assigning assigns said corresponding digital value for each of said third subset of items as the sum of said first digital value and said corresponding internal value, whereby said internal sequence for said third subset of items is preserved in said sorted output.

7. The method of claim 4, wherein each of said first set of items and said second set of items is associated with a corresponding type, wherein said first set of digital values and said second set of digital values are assigned such that subset of items of each type is grouped with items of the same type contained in said first set of items in said sorted output.

8. The method of claim 7, wherein a user specifies a corresponding range of digital values for each type to control said output sequence.

9. The method of claim 4, wherein each of said first set of items and said second set of items comprising said corresponding menu item represents a corresponding action item for a plan in a compensation management application, wherein said first set of items are a first set of action items provided for said plan by a vendor of said compensation management application, and said second set of items represent customized action items defined by customers that are sought to be included along with said first set of action items for said plan, thereby providing customized action items along with vendor provided action items for said plan in said compensation management application.

10. The method of claim 9, wherein said first data source and said second data source comprises respective tables in a database, wherein said assigning and said sorting is performed by a query according to SQL (Structured Query Language).

11. A non-transitory machine readable medium storing one or more sequences of instructions for causing a system to process menu items from different data sources, wherein execution of said one or more sequences of instructions by one or more processors contained in said system causes said system to perform the actions of:

receiving a first set of menu items from a first data source and a second set of menu items from a second data source, each of said second set of menu items being related to a corresponding one of said first set of menu items;

assigning each of said first set of menu items a corresponding one of a first set of digital values and each of said second set of menu items a corresponding one of a second set of digital values, wherein said assigning assigns a first digital value of said first set of digital values to a first item of said first set of items, wherein said assigning assigns a second digital value of said second set of digital values to a second item of said second set of items; and sorting all of said first set of menu items and said second set of menu items according to a sort order of the assigned digital values containing said first set of digital values and said second set of digital values to form a sorted output, wherein said first set of menu items and said second set of menu items are in an output sequence in said sorted output after said sorting, with each item of said one-dimensional list having a corresponding position in said output sequence, wherein each of said first set of digital values and said second set of digital values and said sort order determines the relative position of each item in said output sequence, wherein said first item is positioned before said second item in said output sequence if said first digital value is before said second digital value in said sort order, wherein said first item is positioned after said second item in said output sequence if said first digital value is after said second digital value in said sort order; and sending said sorted output for display on a display unit such that menu items of said second set of menu items are displayed grouped with related ones of corresponding ones of said first set of menu items.

12. The non-transitory machine readable medium of claim 11, wherein said first set of menu items are already in a first sequence, and wherein said sort order is an ascending order or a descending order.

13. The non-transitory machine readable medium of claim 12, wherein a first item and a second item contained in said first set of menu items are respectively assigned a first digital value and a second digital value contained in said first set of digital values, wherein said assigning assigns a corresponding digital value between said first digital value and said second digital value to each of a third subset of menu items that are desired to be grouped with said first item, said third subset of menu items being contained in said second set of menu items, wherein said displaying displays said third subset of menu items after said first menu item on said display unit after said sorting according to said ascending order.

14. The non-transitory machine readable medium of claim 13, wherein each of said third subset of menu items is associated with a corresponding internal value to specify an internal sequence for said third subset of menu items, wherein said assigning assigns said corresponding digital value for each of said third subset of menu items as the sum of said first digital value and said corresponding internal value, whereby said internal sequence for said third subset of menu items is preserved in said sorted output.

15. The non-transitory machine readable medium of claim 12, wherein each of said first set of menu items and said second set of menu items is associated with a corresponding type, wherein said first set of digital values and said second set of digital values are assigned such that subset of menu items of each type is grouped with menu items of the same type contained in said first set of menu items in said sorted output.

16. A system processing menu items from different data sources, said system comprising:
- a processor;
- a random access memory (RAM); and
- a machine readable medium storing a set of instructions, which when executed by said processor causes said system to perform the actions of:
  - receiving a first set of menu items from a first data source and a second set of menu items from a second data source, each of said second set of menu items being related to a corresponding one of said first set of menu items;
  - assigning each of said first set of menu items a corresponding one of a first set of digital values and each of said second set of menu items a corresponding one of a second set of digital values, wherein said assigning assigns a first digital value of said first set of digital values to a first item of said first set of items, wherein said assigning assigns a second digital value of said second set of digital values to a second item of said second set of items; and
  - sorting all of said first set of menu items and said second set of menu items according to a sort order of the assigned digital values containing said first set of digital values and said second set of digital values to form a sorted output,
  - wherein said sorted output is a one-dimensional list containing both of said first set of menu items and said second set of menu items according to said sort order,
  - wherein said first set of menu items and said second set of menu items are in an output sequence in said sorted output after said sorting, wherein each of said first set of digital values and said second set of digital values and said sort order determines the relative position of each item in said output sequence, wherein said first item is positioned before said second item in said output sequence if said first digital value is before said second digital value in said sort order, wherein said first item is positioned after said second item in said output sequence if said first digital value is after said second digital value in said sort order,
  - wherein said first set of digital values and said second set of digital values are assigned such that items of said second set of menu items are grouped with related ones of corresponding ones of said first set of menu items.

17. The system of claim 16, wherein each of said first set of menu items and said second set of menu items is associated with a corresponding type, wherein each of said plurality of subsets contains items of the same type,
- wherein said first set of digital values and said second set of digital values are assigned such that subset of menu items of each type is grouped with items of the same type contained in said first set of menu items in said sorted output.

18. The system of claim 17, wherein said first set of menu items are already in a first sequence, and wherein said sort order is an ascending order or a descending order.

19. The system of claim 18, wherein a third item and a fourth item contained in said first set of menu items are respectively assigned a third digital value and a fourth digital value contained in said first set of digital values,
- wherein said assigning assigns a corresponding digital value between said third digital value and said fourth digital value to each of a third subset of menu items that are desired to be grouped with said first item, said third subset of items being contained in said second set of menu items,
- wherein said displaying displays said third subset of menu items after said first menu item on said display unit after said sorting according to said ascending order.

20. The system of claim 19, wherein each of said third subset of menu items is associated with a corresponding internal value to specify an internal sequence for said third subset of menu items,
- wherein said assigning assigns said corresponding digital value for each of said third subset of menu items as the sum of said third digital value and said corresponding internal value,
- whereby said internal sequence for said third subset of menu items is preserved in said sorted output.

21. The non-transitory machine readable medium of claim 11, wherein both of said first item and said second item are included in said output sequence if said first digital value equals said second digital value.

22. The system of claim 16, wherein both of said first item and said second item are included in said output sequence if said first digital value equals said second digital value.

* * * * *

UNITED STATES PATENT AND TRADEMARK OFFICE
CERTIFICATE OF CORRECTION

PATENT NO. : 8,805,857 B2  
APPLICATION NO. : 12/578585  
DATED : August 12, 2014  
INVENTOR(S) : Bhammar et al.

Page 1 of 1

It is certified that error appears in the above-identified patent and that said Letters Patent is hereby corrected as shown below:

In the Claims

In column 8, line 58, in Claim 3, delete "said of" and insert -- set of --, therefor.

Signed and Sealed this  
Third Day of March, 2015

Michelle K. Lee  
*Deputy Director of the United States Patent and Trademark Office*